United States Patent [19] [11] Patent Number: 4,502,740
Ohura et al. [45] Date of Patent: Mar. 5, 1985

[54] METHOD OF MAKING A RETAINER FOR SOLID TYPE ROLLER BEARING

[75] Inventors: Yukio Ohura, Kawaguchi; George Hatta, Fujisawa; Tadao Nogawa, Ayase, all of Japan

[73] Assignee: Nippon Seiko Kabushiki Kaisha, Tokyo, Japan

[21] Appl. No.: 409,950

[22] Filed: Aug. 20, 1982

[30] Foreign Application Priority Data

Sep. 3, 1981 [JP] Japan ................... 56-137725

[51] Int. Cl.³ .......................... F16C 33/46; B21K 1/05
[52] U.S. Cl. .................................. 29/148.46; 384/572
[58] Field of Search ....................... 308/217, 201; 29/148.4 R, 148.4 C

[56] References Cited

U.S. PATENT DOCUMENTS 3,144,703  8/1964  Einaudi et al. ............... 29/148.4 C
3,416,210 12/1968  Einaudi ........................ 29/148.4 C
3,588,207  6/1971  Greby ............................ 308/201
3,598,459  8/1971  Vannest ......................... 308/217
3,628,839 12/1971  Vannest ......................... 308/217
3,707,753  1/1973  Bailey, Jr. ..................... 29/148.4 C

FOREIGN PATENT DOCUMENTS 54-3641 1/1979 Japan .................... 308/201

Primary Examiner—Stuart S. Levy
Assistant Examiner—Thomas Hannon
Attorney, Agent, or Firm—Wyatt, Gerber, Shoup, Scobey and Badie

[57] ABSTRACT

This specification discloses a method of manufacturing a retainer for solid type roller bearing, a retainer manufactured by the method, and a cutting edge member used in the method. The specification also discloses the formation of roller retaining pawls around a roller retaining hole by cutting and removing post-like projections over a predetermined length by the cutting edge member, the post-like projections being formed on the wall surfaces of rectangular holes of a ring-like retainer member.

2 Claims, 16 Drawing Figures

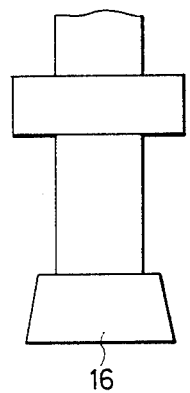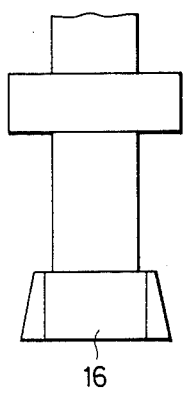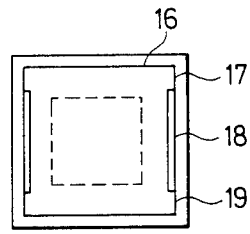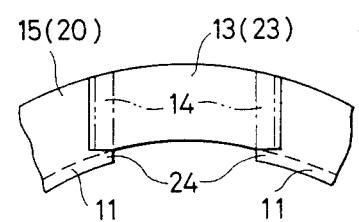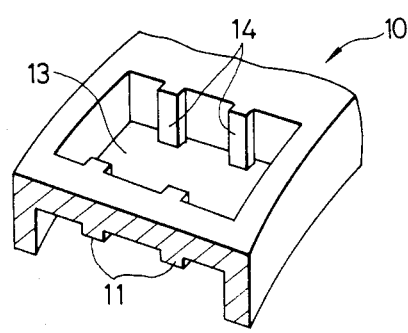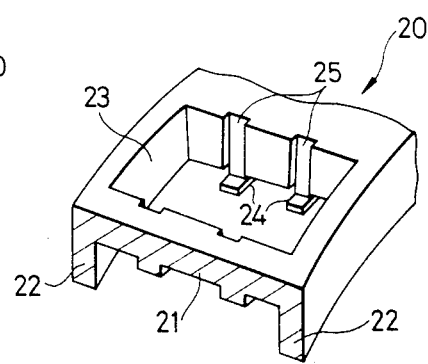

METHOD OF MAKING A RETAINER FOR SOLID TYPE ROLLER BEARING

BACKGROUND OF THE INVENTION

1. Field of the Invention

This invention relates to a retainer for roller bearing, a method of manufacturing the same and a cutting edge member used in the manufacture.

2. Description of the Prior Art

Generally, in cylindrical roller bearings, for example, in the case of cylindrical roller bearings provided with outer race flanges, it has been practised to provide pawls projecting into the roller retaining hole of a retainer in order to prevent the rollers from slipping off the retainer when an inner race is incorporated into an outer race.

The shape and number of the roller retaining pawls are determined in relation to the size of the rollers, but in any case, it is necessary to provide such a degree of resilient deformation capability as will not interfere with the insertion of the rollers and to retain the rollers so that the inserted rollers do not slip off, and it is further required that such retaining pawls can be easily machined.

The retaining pawls in solid type retainers have heretofore been formed by various methods, and typical one of them comprises machining by an end mill post-like projections extending from the wall surfaces opposed to each other circumferentially of a rectangular hole formed in a retainer member formed by a predetermined pre-process, and forming retaining pawls on the inner peripheral surface side or the outer peripheral surface side of the retainer member. In this case, however, only one retaining pawl is formed every cycle of end mill machining and therefore, if it is desired to form a plurality of retaining pawls, for example, four retaining pawls, the end mill machining must be carried out four times and this has been inferior in workability.

SUMMARY OF THE INVENTION

It is a first object of the present invention to provide a method of manufacture of a retainer which does not have the above-noted disadvantage peculiar to the prior art. For this purpose, a plurality of post-like projections are cut at the same time by a cutting edge member provided with a cutting edge portion for cutting the post-like projections of the rectangular holes in a retainer member, and the cutting edge member is stopped on the way (suitably, at a position whereat a slit is formed), whereby retaining pawls are formed by the remaining portions of the post-like projections.

It is a second and a third object to provide a retainer manufactured by the above-described method and to provide a cutting edge member used to manufacture the retainer by the above-described method.

According to the present invention, roller retaining pawls may be formed around a roller retaining hole by inserting the cutting edge member radially only once into the rectangular holes of a retainer member to cut and remove the post-like projections over a predetermined length and therefore, the workability is improved and reduced cost is achieved.

The invention will become more fully apparent from the following detailed description thereof taken in conjunction with the accompanying drawings.

BRIEF DESCRIPTION OF THE DRAWINGS

FIGS. 5(a), 5(b) and 5(c) are a front view, a side view and a bottom plan view, respectively, of a cutting edge member used in the manufacture of the retainer.

FIG. 6 illustrates the machining.

FIG. 7 is a perspective view showing a retainer member before machined.

FIG. 8 is a perspective view showing the retainer after completed.

DESCRIPTION OF THE PREFERRED EMBODIMENTS

Figure 1:
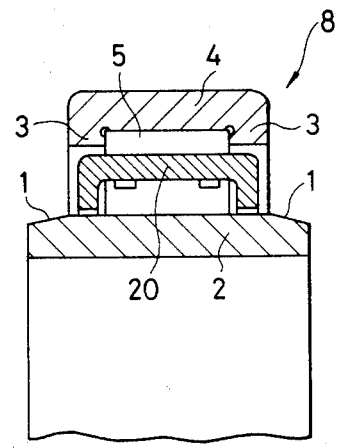
FIG. 1 is a semi-cross-sectional view of a roller bearing into which a retainer manufactured in accordance with the present invention is incorporated.

In a roller bearing 8 shown in FIG. 1, a plurality of rollers 5 are interposed between a relatively wide inner race 2 having tapered opposite side portions 1 and a narrow outer race 4 provided with a flanged portion 3, and are retained by a retainer 20. The retainer 20, as shown in FIGS. 1 and 8, comprises a body portion 21 and opposite flanged portions 22 and has a U-shaped cross-section. A rectangular hole 23 for retaining rollers is formed with four roller retaining pawls 24.

More particularly, the retaining hole 23 is of a rectangular shape defined by longer sides and shorter sides corresponding to the width and diameter, respectively, of the roller 5, and near the inner peripheral surfaces of the longer sides, two rectangular retaining pawls 24 each extend toward the center of the retaining hole 23. The retaining pawls 24 are also projected inwardly of the inner peripheral surface of the body portion 21 and the spacing between the retaining pawls 24 opposed to each other is somewhat smaller than the diameter of the roller 5. Cut-aways 25 of a slight depth having the same width as that of the retaining pawls 24 are formed in the longer sides of the retaining hole 23 at locations corresponding to the retaining pawls 24. The retainer 20 is guided along the inner peripheral surface of the flanged portions 22 by the inner race 2.

Figure 2A:
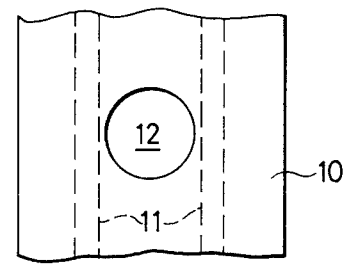
FIGS. 2(a) and 2(b), FIGS. 3(a) and 3(b) and 4(a) and 4(b) are plan views and cross-sectional views, respectively, showing the steps of manufacture of the retainer.
Figure 2B:
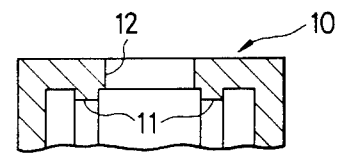
Figure 3A:
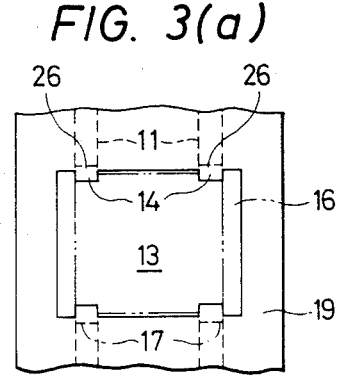
Figure 3B:
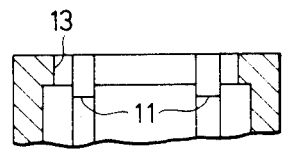

A method of manufacturing the retainer 20 will now be described. First, a ring-like blank 10 of U-shaped cross-section (see FIGS. 2(a) and 2(b)) with a pair of ribs 11 projectedly provided on the inner peripheral surface thereof is prepared and a suitable number of circular holes 12 of a suitable size for forming the retaining pawls 24 are formed at predetermined intervals in the central portion of this blank as viewed widthwise thereof. Subsequently, these circular holes are machined into rectangular holes 13 having longer sides and shorter sides corresponding to the length and diameter, respectively, of the roller 5, by broaching. The longer sides of the rectangular holes 13 (the distance between the widthwise sides of a retainer member 19) is somewhat greater than the spacing between the ribs 11, and post-like projections 14 projecting inwardly of the rectangular holes 13 are formed on the longer sides at locations corresponding to the ribs 11 (see FIGS. 3(a) and 3(b) and FIG. 7). Subsequently, a cutting edge member 15 shown in FIGS. 5(a)–5(c) is forced into the rectangular hole 13 from radially outward thereof to cut the post-like projections 14, and then the cutting edge member is stopped at a predetermined position, whereby the retaining pawls 24 are formed on the inner peripheral surface side.

Figure 4A:
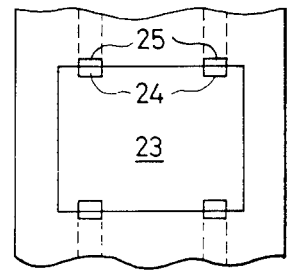
Figure 4B:
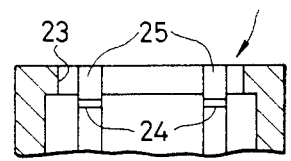

The cutting edge portion 16 of the cutting edge member 15 is made into the form of a rectangular drill corresponding to the rectangular hole 13 and the central portions 18 of the longer sides are removed with the projected portions on the opposite sides thereof providing cutting edges 17 for cutting the post-like projections. The relation between the cutting edge portion 16 and the rectangular hole 13 is as shown by dots-and-dash lines in FIG. 3(a), and with the workability and maintenance of accuracy of the retaining pawls 24 taken into account, the post-like projections 14 and portions 26 of the body portion 21 are cut by the cutting edge 17 at the same time. That is, when the cutting edge member 15 is inserted into the rectangular hole 13 from the outer peripheral surface side, the four post-like projections 14 and the portions 26 of the body portion 21 are cut away by the cutting edge 17 at the same time, whereby cut-aways 25 are formed and, when the downward movement of the cutting edge member 15 is stopped at a predetermined position (such a position that the post-like projections 14 will remain by an amount corresponding to a predetermined height, for example, the height of the ribs 11, see FIG. 6), there are formed four retaining pawls 24 equal in width to the post-like projections 14 and projected by the same degree as the ribs 11, as shown in FIGS. 4(a) and 4(b).

The cylindrical roller bearing 8 (FIG. 1) including the thus manufactured retainer 20 is assembled by positioning the retainer 20 inside the outer race 4, resiliently deforming the retaining pawls 24 from the inner peripheral surface side of the retainer 20 and inserting the rollers 5 into the retaining hole 23, and fitting the inner race 2 to the assembly of the outer race 4, the retainer 20 and the rollers 5. Slip-off of the rollers 5 is well prevented by the retainer pawls 24 at this time.

If the retaining pawls 24 are formed by the use of such method, the four retaining pawls 24 can be worked at the same time by a single working process and this leads to improved workability, and the spacing between the adjacent retaining pawls 24 can be made great and therefore, the rollers 5 can be held in a stable attitude and it is desirable from the viewpoint of the strength of the retaining pawls 24 that the depth of the cut-aways can be made small. These have been difficult with the conventional end mill machining.

Figure 9A:
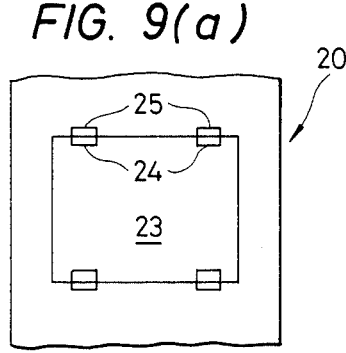
FIGS. 9(a) and 9(b) are a front view and a cross-sectional (corresponding to FIGS. 4(a) and 4(b)), respectively, of a retainer formed by another embodiment of the present invention.
Figure 9B:
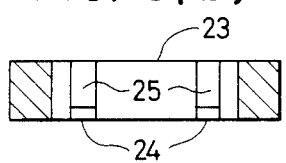

The cross-sectional shape of the retainer is not restricted to the U-shape, but use may also be made of a shape which has a flat rectangular cross-section as shown in FIGS. 9(a) and 9(b) and in which retaining pawls 24 are formed on the inner peripheral surface side of the retaining hole 23. Such retainer 20 is manufactured by preparing a cylindrical blank having a flat rectangular cross-section and subjecting it to the above-described manufacturing process (see FIGS. 2 to 4), and there is little or no gap between the inner peripheral surface thereof and the inner race and therefore, it is necessary to make such a design that the retaining pawls 24 do not project inwardly from the inner peripheral surface of the retainer 20. The other circumstances are entirely similar to those of the above-described embodiment and therefore need not be described in detail.

Figure 10:
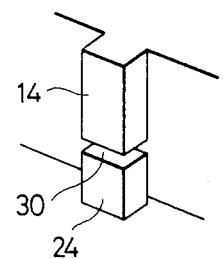
FIG. 10 illustrates partial perspective view of a retainer member used another embodiment of the present invention.

Of the post-like projections, the portions to be cut and the portions to be left as the retaining pawls are not always exactly distinguished from each other and therefore, burrs may sometimes be created during cutting. To prevent this, as shown in FIG. 10, a slit 30 is formed at a predetermined height in the post-like projection 14, namely, at a height to be left as the retaining pawl 24, in a direction interrupting the projection 14 (a direction perpendicular to the lengthwise direction) and only the portion above the slit 30 is cut, whereby the remaining portion is left as the retaining pawl while keeping its initial shape and this is effective. Forming the slit in this manner is also effective to prevent the workability from being deteriorated by relative positional deviation of the retainer member 19 and the cutting edge member 15.

The shape and size of the retaining hole 23 and the shape (width, thickness and amount of projection), position, number, etc. of the retaining pawls 24 may of course be changed as required. The presence and shape of the cut-aways 25 may be chosen as desired.

We claim:

1. A method of manufacturing a retainer for retaining cylindrical rolling elements of a solid type roller bearing, comprising the steps of:

preparing an annular retainer member having a plurality of circumferentially spaced and radially directed rectangular holes formed therethrough and each defined by a pair of axially opposed end walls and a pair of circumferentially opposed end walls, said rectangular holes being formed with a pair of projections extending from each of said circumferentially opposed walls continuously over the outer to inner diameters thereof; and inserting a single cutting edge member radially inwardly into said rectangular holes by a predetermined distance to cut and remove each said projection of a hole over the predetermined distance at the same time, the cutting edge member having a cutting edge body of rectangular cross-section of the size to be inserted into each of said rectangular holes, the cutting edge body being formed with two pairs of cutting edges projected from the opposed walls of the cutting edge body, each cutting edge being so dimensioned that when the cutting edge body is inserted into the rectangular hole the cutting edge may cut radially the corresponding projection, whereby roller retaining pawls are formed aroung each hole by the remaining portions of the projections.

2. A method of manufacturing a retainer for retaining cylindrical rolling elements of a solid type roller bearing, comprising the steps of:

preparing an annular retainer member having a plurality of circumferentially spaced and radially directed rectangular holes formed therethrough and each defined by a pair of axially opposed end walls and a pair of circumferentially opposed end walls, said rectangular holes being formed with a pair of projections extending from each of said circumferentially opposed walls continuously over the outer to inner diameters thereof;

forming a slit through each of said projections at a predetermined distance from the outer diameter of the retainer member to interrupt said projections; and inserting a single cutting edge member radially inwardly into said rectangular holes until said slits are reached to cut and remove said projections of a hole over the predetermined distance at the same time, the cutting edge member having a cutting edge body of rectangular cross-section of the size to be inserted into each of said rectangular holes, the cutting edge body being formed with two pairs of cutting edges projected from the opposed walls of the cutting edge body, each cutting edge being so dimensioned that when the cutting edge body is inserted into the rectangular hole the cutting edge may cut radially the corresponding projection, whereby roller retaining pawls are formed around each hole by the remaining portions of the projections.

* * * * *